United States Patent
Welchko et al.

(10) Patent No.: US 10,164,559 B1
(45) Date of Patent: Dec. 25, 2018

(54) SYSTEM AND METHOD FOR MEASURING AND DIAGNOSING INITIAL OFFSETS OF AN ANALOG INPUT SENSOR

(71) Applicant: GM GLOBAL TECHNOLOGY OPERATIONS LLC, Detroit, MI (US)

(72) Inventors: Brian A. Welchko, Oakland, MI (US); Siddharth Ballal, Shelby Township, MI (US); Wesley G. Zanardelli, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 29 days.

(21) Appl. No.: 15/625,591

(22) Filed: Jun. 16, 2017

(51) Int. Cl.
*H02P 23/14* (2006.01)
*H02P 23/00* (2016.01)
*B60L 11/18* (2006.01)

(52) U.S. Cl.
CPC ...... *H02P 23/0077* (2013.01); *B60L 11/1803* (2013.01); *H02P 23/14* (2013.01)

(58) Field of Classification Search
None
See application file for complete search history.

(56) References Cited

U.S. PATENT DOCUMENTS

| | | | | |
|---|---|---|---|---|
| 5,361,210 A | * | 11/1994 | Fu | B62D 5/046 180/446 |
| 2005/0167172 A1 | * | 8/2005 | Fernandez | B60L 1/00 180/65.8 |
| 2012/0212051 A1 | * | 8/2012 | Heidenreich | H02J 9/062 307/23 |
| 2017/0022955 A1 | * | 1/2017 | Steele | F02N 11/0866 |

* cited by examiner

*Primary Examiner* — Bentsu Ro
(74) *Attorney, Agent, or Firm* — Quinn IP Law

(57) ABSTRACT

An electric power system includes a polyphase electric machine, battery pack, power inverter module, analog input sensor, and diagnostic controller executing a method. The sensor measures an electrical parameter that differs from a true value of the parameter by an initial offset value. The controller collects sample sets of the parameter, compares the initial offset of each sample to an outlier threshold in a first diagnostic loop, and transmits a bit flag indicative of an outlier sample to a slower second diagnostic loop when the initial offset of a sample exceeds the outlier threshold. The second control loop calculates a rolling average of the initial offsets of the sample sets, discards the set containing the outlier sample in response to the bit flag, and executes a control action when the average exceeds a threshold that is lower than the outlier threshold.

16 Claims, 2 Drawing Sheets

SYSTEM AND METHOD FOR MEASURING AND DIAGNOSING INITIAL OFFSETS OF AN ANALOG INPUT SENSOR

INTRODUCTION

Electric power systems are used to provide a reliable source of torque in a variety of beneficial applications. An electric power system typically includes a polyphase electric machine that is connected to a battery pack via a power inverter. When the individual phase windings of the electric machine are energized using pulse-width modulation or other types of high-speed semiconductor switching control of the power inverter, an output shaft of the electric machine delivers a defined torque. The rotating output shaft alternatively powers a coupled load or generates electricity depending on the operating mode and configuration of the electric machine.

Precise operational control over the functions of the electric machine and other connected power electronic components of the electric power system is predicated on the accurate real-time determination of certain electrical parameters. To this end, analog input sensors may be used within the electric power system to directly measure and report such parameters. Analog sensors have a performance quality known as an initial offset that describes a bias-based variance of the sensor's voltage output reading from an expected reading. For instance, when using a current sensor at 0 amps, the sensor may output a voltage corresponding to ±15 amps, in which case the initial offset of the sensor is 15 amps. For improved accuracy, therefore, the initial offset of a given sensor is determined and subtracted from the sensor's reported values before use of the measured value in a control system.

SUMMARY

An electric power system of the type described herein has one or more analog input sensors, such as but not limited to phase current sensors or voltage bus sensors. Also described is an associated method for measuring and diagnosing the initial offset of such sensors. The present approach is intended to improve the robustness of existing sensor diagnostic methodologies, particularly in response to transient voltage dips or sags that may occur on an auxiliary (low-voltage) bus upon system start-up.

In an example embodiment of the disclosed method, separate but interrelated diagnostic loops of a diagnostic controller function together to collect and average sets of electrical data samples, with the diagnostic loop performing the data collection function at a faster cycle speed/loop speed than the diagnostic loop that is performing the core diagnostic function. For illustrative clarity, the diagnostic control loops are described herein as "fast" and "slow", with the fast loop possibly operating in the kilohertz (kHz) range in some embodiments and the slow loop functioning at about 100 Hz, or with the fast loop being about 1 or 2 orders of magnitude faster than the slow loop.

The fast loop is configured to set a bit flag when the initial offset of a given electrical data sample exceeds a calibrated offset threshold, with the calibrated offset threshold set well in excess of a historic average offset. As used herein, the term "well in excess of" means at least about 3-4 times the historic rolling average of the initial offset, with such a sample referred to herein as an "outlier sample". When the fast loop bit flag is set, the slow loop may respond by automatically discarding the set of data samples to which the outlier sample belongs. The fast loop may thereafter attempt to collect another set of electrical data samples to replace the discarded set.

At the same time, the slow loop performs an X/Y fast-pass process, i.e., with a control action performed with respect to the system when an average of a predetermined threshold (X) of the collected data samples falls within a predetermined number (Y) of consecutive sample sets. In this manner, the present approach provides a specific improvement to the overall operational accuracy of analog input sensor diagnostic computers in electric power systems of the type described herein.

An electric power system is also disclosed that is controlled via the method noted above. The system may include a polyphase electric machine having a plurality of phase windings and a rotatable output shaft, a battery pack connected to a direct current (DC) voltage bus, a power inverter module (PIM), an analog input sensor, and a diagnostic controller. The PIM is connected to the battery pack via the DC voltage bus, and to the electric machine via the phase windings. The analog input sensor measures an electrical parameter of the electric power system, such as a phase current or voltage or a DC bus voltage.

The diagnostic controller in this embodiment is configured to diagnose the initial offset value upon start-up of the system. The controller does so by collecting sample sets of the electrical parameter and comparing an initial offset of each sample in the collected sample sets to a calibrated outlier threshold using a first diagnostic loop, and then transmitting a bit flag indicative of an outlier sample from the first diagnostic loop to a slower second diagnostic loop when the initial offset of one or more of the samples exceeds the calibrated outlier threshold. The second control loop is also configured to calculate a rolling average of the initial offsets of the collected sample sets, discard the sample set containing the outlier sample in response to the bit flag, and execute a control action with respect to the system when the calculated rolling average exceeds an average threshold that is lower than the outlier threshold.

The diagnostic controller executes the control action in certain embodiments by setting or transmitting a diagnostic code to memory of the controller or to a remote device, such as via a vehicle telematics unit.

The electric power system may be used as part of a motor vehicle having road wheels and a transmission, with the electric machine having an output shaft connected to the road wheels via the transmission.

In another example embodiment, a vehicle includes a transmission and the electric power system, in this instance with the sensors embodied as a plurality of analog current sensors each configured to measure a corresponding phase current or voltage of the electric machine. The controller is configured, in response to an ignition-on or key-on event of the vehicle, to perform the above-described method, and to execute a control action with respect to the system when the calculated rolling average exceeds a rolling average threshold, e.g., of between 25 and 35 percent of the calibrated outlier threshold.

The above-described and other features and advantages of the present disclosure are readily apparent from the following detailed description of the best modes for carrying out the disclosure when taken in connection with the accompanying drawings.

Figure 1:
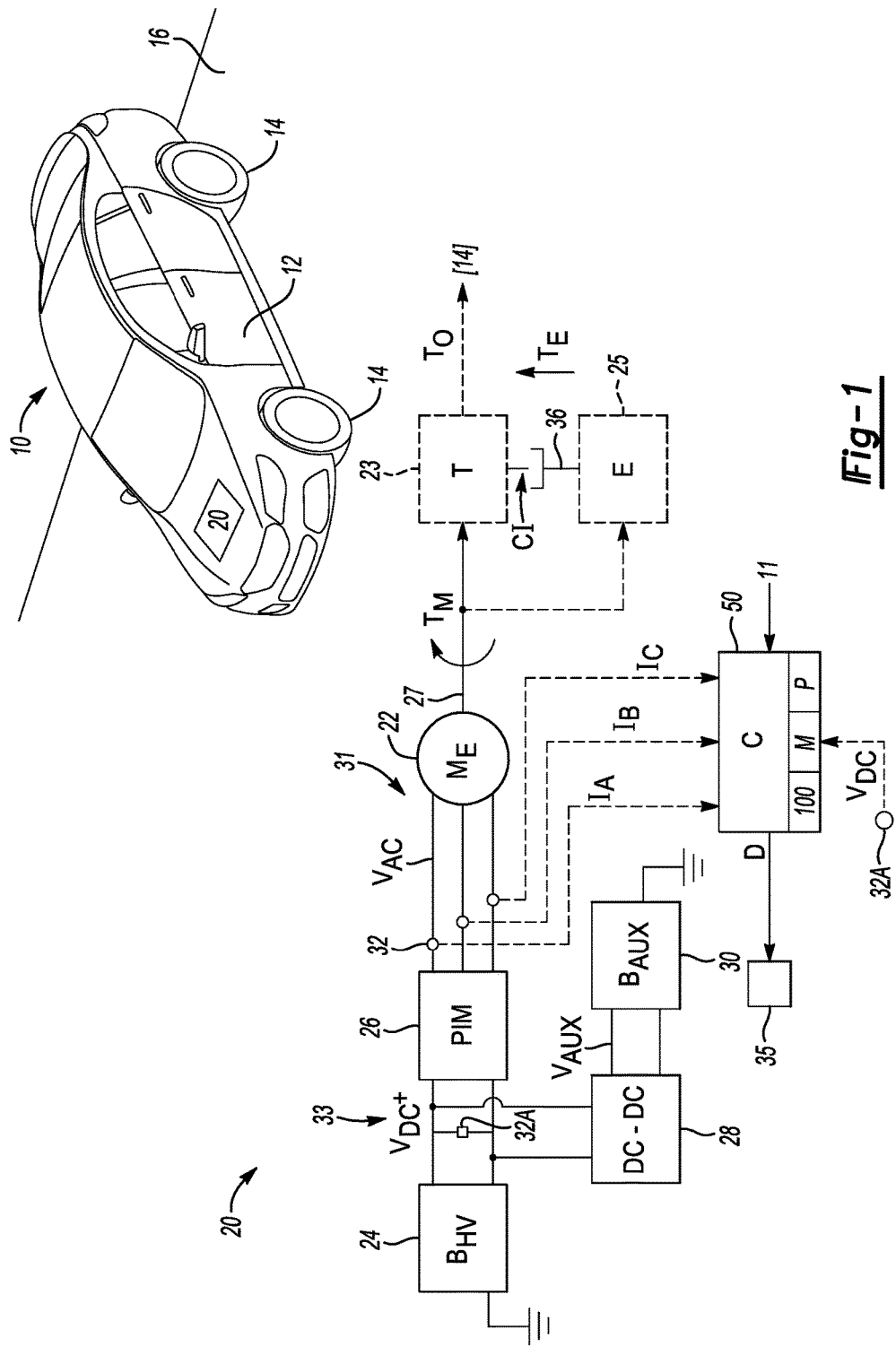
FIG. 1 is a schematic illustration of an example motor vehicle having an electric power system, an analog input sensor, and a diagnostic controller configured to execute a method for diagnosing initial offset values of the sensor.

The present disclosure is susceptible to various modifications and alternative forms, and some representative embodiments have been shown by way of example in the drawings and will be described in detail herein. Novel aspects of this disclosure are not limited to the particular forms illustrated in the drawings. Rather, the disclosure is intended to cover modifications, equivalents, combinations, or alternatives falling within the spirit and scope of the disclosure as defined by the appended claims.

DETAILED DESCRIPTION

Referring to the drawings, wherein like reference numbers refer to like components throughout the several views, FIG. 1 depicts an example electric power system 20 having one or more analog input sensors 32. The sensors 32 may be variously embodied as individual phase current or phase voltage sensors, as direct current (DC) voltage bus sensors 32A, or other types of analog input sensors having a predefined output voltage range, e.g., ±0-5 $V_{DC}$, with each value in the range corresponding to a particular measured input value. For example, when using the sensors 32, an actual/true value of ±200 A-600 A may be measured a high-current embodiment or ±60-300 $V_{DC}$ or more in a high-voltage embodiment. The measured parameter differs from the true value by an initial offset value, as noted above and understood in the art.

The electric power system 20 further includes a diagnostic controller (C) 50 that is programmed and otherwise configured to perform instructions of a method 100 for measuring and diagnosing the initial offset values of the analog input sensors 32 or 32A, with the method 100 described in detail below with references to respective subroutines 100A and 100B of FIGS. 2A and 2B. For illustrative consistency, an example application is described for the method 100 in which the electric power system 20 of FIG. 1 is used as part of a motor vehicle 10, such as a battery electric vehicle or a hybrid electric vehicle, with such a vehicle 10 having a vehicle body 12 and road wheels 14 in rolling contact with a road surface 16. However, the electric power system 12 is not limited to mobile applications in general or automotive applications in particular. Possible applications include stationary power plants, appliances, robots, and other such systems constructed using the analog input sensors 32 or 32A and other basic electrical components as shown in FIG. 1.

The electric power system 20 includes one or more electric machines (ME) 22 energized when a polyphase/alternating current output voltage ($V_{AC}$) is applied by a power inverter module (PIM) 26 to individual phase windings 31 of the electric machine 22. The PIM 26 is electrically connected to a DC voltage bus 33 providing a DC voltage ($V_{DC}$) from a high-voltage battery pack 24 ($B_{HV}$). A DC-DC voltage converter 28 may be connected to the DC voltage bus 33 and controlled so as to reduce the voltage level from the battery pack 24 to lower voltage auxiliary levels on an auxiliary voltage bus ($V_{AUX}$), e.g., 12-15 $V_{DC}$. A lead-acid or other suitable auxiliary battery ($B_{AUX}$) 30 may be connected to the DC-DC converter 28 and used to power connected auxiliary devices (not shown) such as radios, lights, and auxiliary motors.

With respect to the electric machine 22, this device includes an output shaft 27 that rotates when the electric machine 22 is energized, which occurs in response to a controlled internal semiconductor switching operation of the PIM 26. Rotation of the output shaft 27 provides motor output torque (arrow $T_M$) to a connected load, e.g., the road wheels 14 in the example motor vehicle 10. In such an embodiment, a transmission (T) 23 may be disposed between the electric machine 22 and the road wheels 14, with the motor output torque (arrow $T_M$) ultimately transferred through one or more gear sets or a continuously variable pulley configuration to provide a transmission output torque (arrow $T_O$). Similarly, an internal combustion engine (E) 25 may be cranked and started in some embodiments using the motor output torque (arrow $T_M$), e.g., in a belted alternator starter configuration, with the engine 25 coupled with and delivering engine torque (arrow $T_E$) to the transmission 23 via a suitable drive connection 36, for example via an input clutch (CI) in the form of a friction clutch or a hydrodynamic torque converter.

The diagnostic controller 50 of FIG. 1, which is in communication with the electric power system 20 over a controller area network (CAN) bus or other suitable communications channels, includes a processor (P) and memory (M). The memory (M) may include tangible, non-transitory memory, e.g., read only memory, whether optical, magnetic, flash, or otherwise. The controller 50 also includes sufficient amounts of random access memory, electrically-erasable programmable read only memory, etc., as well as a high-speed clock, analog-to-digital and digital-to-analog circuitry, and input/output circuitry and devices, as well as appropriate signal conditioning and buffer circuitry.

Figure 2A:
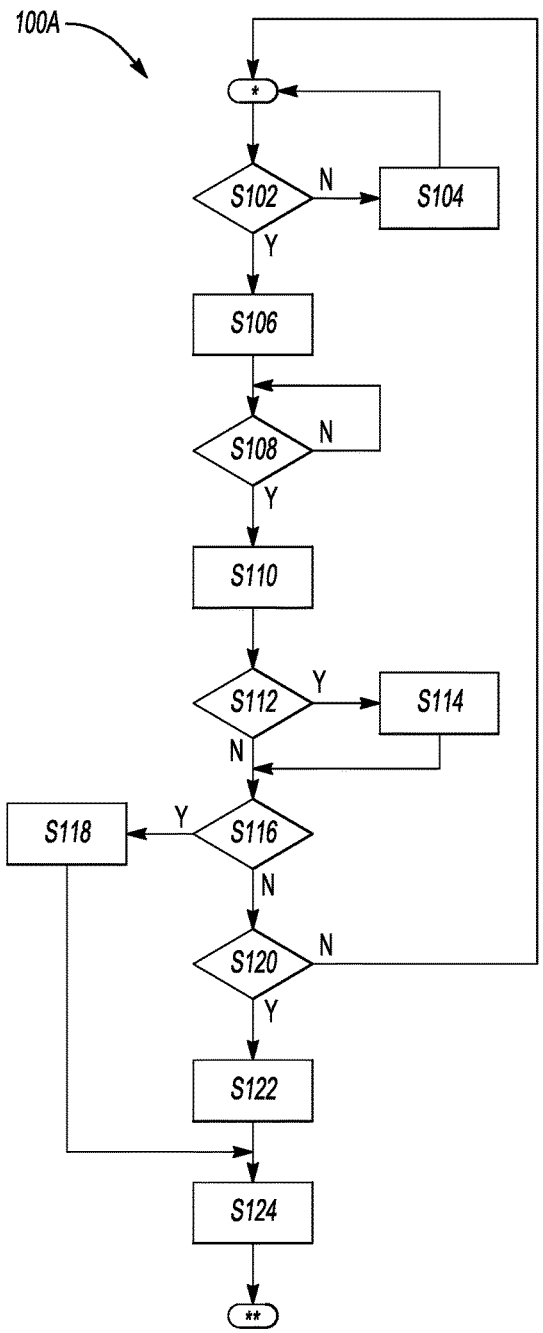
FIGS. 2A and 2B are logic flow diagrams describing an example embodiment of the present method with respect to respective slow and fast control loops of the controller.
Figure 2B:
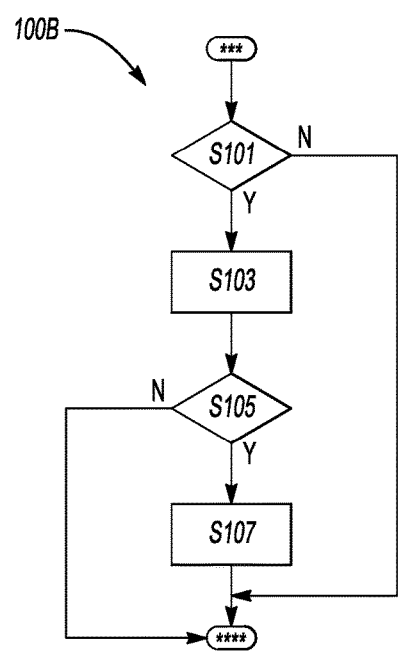

In particular, the diagnostic controller 50 is programmed or otherwise configured to execute instructions embodying the method 100, an example of which is depicted in FIGS. 2A and 2B as slow loop and fast loop subroutines 100A and 100B, respectively. To this end, the controller 50 is in communication with the analog input sensors 32, such as the three separate phase sensors 32 electrically connected to a corresponding one of the phase windings of the electric machine 22 as shown. Thus, the controller 50 is configured to receive the measured phase currents $I_A$, $I_B$, and $I_C$ from the three sensors 32 in a three-phase current sensing embodiment, or three corresponding measured phase voltages (not shown) in a possible voltage sensor configuration.

Alternatively, two such sensors 32 may be used to measure two of the three possible phase currents or voltages in a 3-phase embodiment of the electric machine 22, with the third phase current or voltage calculated in logic of the controller 50 using the two measured values. However, the illustrated three-sensor embodiment may be used to provide increased fault tolerance. Also illustrated is an optional embodiment in which the sensor 32A is disposed on the DC voltage bus and used to measure the DC bus voltage ($V_{DC}$), with the method 100 being readily modified for such use as noted below with particular reference to FIGS. 2A and 2B.

In the execution of the method 100, the controller 50 receives input signals (arrow 11) from the electric power system 20 in addition to the measured sensor values from the analog input sensors 32 or 32A. For instance, the controller 50 receives input signals (arrow 11) such as ambient temperature, key/ignition switch on/off position, running state of the electric machine 22 or PIM 26, or other information pertaining to determining entry conditions for execution of the method 100. The controller 50 may also be in communication with a remote device 35 such as an indicator lamp, telematics unit, or display screen, and configured to selectively output a diagnostic code (arrow D) to the remote device 35 in response to certain diagnostic results.

Operation of the controller 50 in the ongoing diagnosis of the analog input sensors 32 or 32A will now be described with reference to FIGS. 2A and 2B, which respectively describe the above-noted slow and fast diagnostic loops in the form of subroutines 100A and 100B. While the actual cycle time of each loop may vary with the intended application and number of samples per sample set, for illustrative purposes the slow loop may have a cycle time on the order of about 100 Hz, with the cycle time of the fast loop being 1 or 2 orders of magnitude greater than that of the slow loop.

Diagnostic Slow Loop

Beginning with initialization (*) of the controller 50 of FIG. 2A and continuing with step S102 of the subroutine 100A, the controller 50 determines whether certain diagnostic entry conditions are satisfied. As the method 100 captures data concurrently with certain operating conditions in which the output voltage of the auxiliary battery 30 may temporarily sag or dip, the entry conditions may include a detected key-on or ignition-on state, as reported to the controller 50 of FIG. 1 via the input signals (arrow 11). Also as part of the entry conditions, the controller 50 may determine whether a rotational output speed of the electric machine 22 is zero and switching control of the PIM 26 has not commenced. The subroutine 100A proceeds to step S104 if these entry conditions are not satisfied, and to step S106 in the alternative when the entry conditions are satisfied.

Step S104 includes setting a corresponding bit flag to 0 or "FALSE", resetting the counters used in the various steps below, and returning to the initialization step (*).

Step S106 includes setting a corresponding bit flag to 1 or "TRUE" and proceeding to step S108. Also as part of step S106, the controller 50 may instruct the fast loop to commence collection of electrical data from the analog input sensors 32, e.g., via a handshake communication protocol.

At step S108, the controller 50 determines whether a sufficient sample size of initial offset values of the sensors 32 has been collected, such as by comparing the sample size to a predetermined threshold. In certain applications, a sample set of about 40 to 125 samples may be deemed sufficient for the purpose of average calculation. Subroutine 100A repeats step 108 until the threshold sample size has been collected and then proceeds to step S110.

Step S110 includes setting the corresponding bit flag to 0/FALSE and commencing averaging of the collected samples. The controller 50 may add the values of the sampled offsets and then divide this number by the total number of samples in the sample set. The controller 50 then resets the corresponding bit flag to 1/TRUE and increments a sample counter to indicate a successful averaging function. The subroutine 100A then proceeds to step S112.

At step S112, the controller 50 next determines whether the calculated average offset from step S110 exceeds a calibrated average threshold over a predetermined number of sample sets, for instance by performing an X/Y fast-pass process. At step S112, the controller 50 also determines, via receipt of a bit flag from the diagnostic fast loop described below with reference to FIG. 2B, whether the fast loop has detected, for the present sample set, one or more discrete samples exceeding a calibrated outlier threshold. The subroutine 100A proceeds to step S114 if either condition is true, and to step S116 in the alternative.

Step S114 includes incrementing a failure counter and proceeding to step S116. When step S112 described above determines that the diagnostic fast loop has detected a sample exceeding an outlier threshold, step S114 may also include resetting the bit flag and discarding the sample set having such a sample and attempting to collect a clean data set lacking such an outlying sample. Doing so may allow the output of the sensor 32 to recover from a transient voltage spike or dip.

Step S116 includes determining, via the controller 50, whether more than a calibrated number of allowable failures have been detected. If so, the subroutine 100A proceeds to step S118. Otherwise, the subroutine 100A proceeds to step S120.

At step S118, the controller 50 generates a diagnostic code indicative of a failing average (high average over a calibrated number of sample sets). The diagnostic code may be recorded in memory (M) of the controller 50, or such a code may be communicated to the remote device 35 of FIG. 1 as the diagnostic code (arrow D). As the particular problem of a failing battery 30 of FIG. 1 may manifest itself upon start up, the diagnostic code (arrow D) may report a need for servicing or replacement of the battery 30. The subroutine 100A thereafter proceeds to step S124.

Step S120 includes determining whether a passing threshold has been achieved. Similar to step S118, step S120 may include comparing the number of passing sample sets to a calibrated passing threshold, and repeating step S102 if such a threshold is not achieved. Step S122 is executed in the alternative when the passing threshold is achieved.

Step S122 is analogous to step S118, however with the controller 50 in this instance generating a diagnostic code indicative of a passing average (acceptable average over a calibrated number of sample sets). The passing diagnostic code may be recorded in memory (M) of the controller 50, or such a code may be communicated to the remote device 35 of FIG. 1 as the diagnostic code (arrow D). The subroutine 100A thereafter proceeds to step S124.

Step S124 entails resetting the above-noted counters to zero, and then exiting the slow loop (**). The subroutine 100A may commence anew at the next key-on or ignition-on event satisfying the entry conditions of step S102.

Diagnostic Fast Loop

FIG. 2B depicts an example embodiment of a subroutine 100B suitable for performing data collection and discrete threshold comparison as part of the method 100. Upon initialization (*) of the controller 50, the subroutine 100B determines at step S101 if the average flag noted above with reference to step S106 is TRUE, which once again means that entry conditions for executing method 100 have been satisfied. If so, the subroutine 100B proceeds to step S103. Otherwise, the fast loop exists (**) and awaits satisfaction of the entry conditions.

Step S103 includes collecting the sensor data from the analog input sensors 32. As part of step S103, the controller 50 may also add the present measurements to a sum of previously-collected measurements for a given sample set, as well as increment a sample counter for the present sample set. Such counter values may be used by the slow loop of subroutine 100A to evaluate when a sufficient sample set has been collected as well as to ascertain the average offset value for the data set. The subroutine 100B then proceeds to step S105.

At step S105 the controller 50 determines, for the present data sample, whether the sample exceeds a calibrated outlier threshold. As stated above, in an illustrative embodiment in which the sensors 32 are connected to a respective one of the phase windings of the electric machine 22 of FIG. 1 and configured to measure and report a corresponding phase value, e.g., a phase current $I_A$, $I_B$, or $I_C$, an example outlier threshold may be an absolute current magnitude that is set sufficiently higher, e.g., 3-4 times higher, than the threshold used for the rolling average of collected offset values. The outlier threshold should be set high enough that inclusion of the sample value in the sample set could skew the average for the data set, and thus the actual threshold may be expected to vary with the intended application. The subroutine 100B proceeds to step S107 when the measured sample exceeds the outlier threshold, with the subroutine 100B exiting (****) when all samples in the sample set are below such a threshold.

Step S107 includes setting a bit flag that is indicative of the outlier threshold having been exceeded in step S105. The bit flag is communicated to the slow loop and subroutine 100A of FIG. 2A for use in step S112. The subroutine 100B then exits (****) and starts anew with the next iteration or ignition/key-on event satisfying the requisite entry conditions.

The method 100, an example of which is described above with reference to subroutines 100A and 100B of FIGS. 2A and 2B, may therefore be used to improve existing diagnostic approaches. That is, a check is added in the diagnostic fast loop of FIG. 2B that communicates to the slow loop of FIG. 2A that one of the sample data points falls outside of a measurement norm, i.e., exceeds the above-described outlier threshold. One or more such elevated values may skew the measured offset while still passing under pure average-based diagnostic methods. The present approach, while taking slightly more time to collect a replacement data set to replace the discarded set containing outliers, is intended to improve the robustness of the system 12 by allowing for recovery of the diagnostic method 100 from transient voltage dips on the auxiliary voltage bus ($V_{AUX}$) of FIG. 1.

While aspects of the present disclosure have been described in detail with reference to the illustrated embodiments, those skilled in the art will recognize that modifications may be made without departing from the scope of the present disclosure. The present disclosure is not limited to the precise construction and compositions disclosed herein, as modifications or variations apparent from the foregoing descriptions are within the scope of the disclosure as defined in the appended claims. Moreover, the present concepts may expressly include combinations and sub-combinations of the preceding elements and features.

What is claimed is:

1. An electric power system comprising:
   a polyphase electric machine having a plurality of phase windings;
   a battery pack connected to a direct current (DC) voltage bus;
   a power inverter module (PIM) connected to the battery pack via the DC voltage bus, and to the electric machine via the phase windings;
   an analog input sensor configured to measure an electrical parameter of the electric power system, wherein the measured electrical parameter differs from a true value of the electrical parameter by an initial offset value; and
   a diagnostic controller in communication with the analog input sensor, and configured to:
      collect sample sets of the electrical parameter;
      compare the initial offset of each sample in the collected sample sets to a calibrated outlier threshold using a first diagnostic loop; and
      transmit a bit flag indicative of an outlier sample from the first diagnostic loop to a slower second diagnostic loop when the initial offset of one or more of the samples exceeds the outlier threshold, the second control loop further being configured to:
         calculate a rolling average of the initial offsets of the collected sample set;
         discard the sample set containing the outlier sample in response to the bit flag; and
         execute a control action with respect to the system when the calculated rolling average exceeds a rolling average threshold that is lower than the outlier threshold.

2. The electric power system of claim 1, wherein the analog input sensor includes a plurality of phase current or phase voltage sensors each electrically connected to a corresponding one of the phase windings.

3. The electric power system of claim 2, wherein the outlier threshold is at least three times greater than the rolling average threshold.

4. The electric power system of claim 1, wherein the analog input sensor includes a voltage bus sensor connected to the DC voltage bus.

5. The electric power system of claim 1, wherein the first diagnostic loop has a cycle time of that is 1 and 2 orders of magnitude faster than a cycle time of the second diagnostic loop.

6. The electric power system of claim 1, wherein the controller executes the control by setting or transmitting a diagnostic code to memory of the controller or to a remote device.

7. The electric power system of claim 1, wherein the electric power system is used as part of a motor vehicle having road wheels and a transmission, and wherein the electric machine has an output shaft connected to the road wheels via the transmission.

8. A method for measuring and diagnosing an initial offset of an analog input sensor in an electric power system, wherein the measured electrical parameter differs from a true value of the electrical parameter by the initial offset, the method comprising:
   collecting sample sets of the electrical parameter via the analog input sensor;
   calculating and comparing the initial offset of each sample in the collected sample sets to a calibrated outlier threshold using a first diagnostic loop of a controller;
   transmitting a bit flag indicative of an outlier sample from the first diagnostic loop to a slower second diagnostic loop of the controller when the initial offset of one or more of the samples exceeds the outlier threshold;
   calculating a rolling average of the initial offsets of the collected sample sets via the second diagnostic control loop;
   discarding the sample set containing the outlier sample in response to the bit flag; and
   executing a control action with respect to the system via the controller when the calculated rolling average exceeds a rolling average threshold that is lower than the outlier threshold, including recording a diagnostic code in memory of the controller or transmitting the diagnostic code to a remote device.

9. The method of claim 8, wherein the analog input sensor includes a plurality of phase sensors each connected to a corresponding one of the phase windings and the parameter is a corresponding phase current or phase voltage of the electric machine.

10. The method of claim 8, wherein the outlier threshold is at least three times greater than the rolling average threshold.

11. The method of claim 8, wherein the analog input sensor includes a voltage bus sensor connected to the DC voltage bus.

12. The method of claim 8, wherein the wherein the first diagnostic loop has a cycle time of that is 1 or 2 orders of magnitude faster than a cycle time of the second diagnostic loop.

13. The method of claim 8, further comprising using the electric machine to rotate an output shaft connected via a transmission to a set of road wheels of a vehicle.

14. A vehicle comprising:
a transmission; and
an electric power system comprising:
- a polyphase electric machine having a plurality of phase windings, and further having an output shaft connected to the transmission;
- a battery pack connected to a direct current (DC) voltage bus;
- a power inverter module (PIM) connected to the battery pack via the DC voltage bus, and to the electric machine via the phase windings;
- a plurality of analog input sensors each configured to measure a corresponding phase current or phase voltage of the electric machine, wherein the measured phase current differs from a true value of the phase current or phase voltage by an initial offset; and
- a diagnostic controller in communication with the analog input sensors and configured, in response to an ignition-on or key-on event of the vehicle, to collect sample sets of the phase currents or phase voltages and compare the initial offset of each sample in the collected sample sets to a calibrated outlier threshold using a first diagnostic loop, transmit a bit flag indicative of an outlier sample from the first diagnostic loop to a second diagnostic loop that has a slower cycle speed than the first diagnostic loop when the initial offset of one or more of the samples exceeds the outlier threshold, the second control loop further being configured to calculate a rolling average of the initial offsets of the collected sample sets, discard the sample set containing the outlier sample in response to the bit flag, and execute a control action with respect to the system when the calculated rolling average exceeds a rolling average threshold.

15. The vehicle of claim 14, wherein the outlier threshold is at least three times larger than the rolling average threshold.

16. The vehicle of claim 14, wherein the controller executes the control by setting or transmitting a diagnostic code to memory of the controller or to a remote device.

* * * * *